Nov. 26, 1968  M. L. BRAMSON  3,413,095
MEMBRANE OXYGENATOR

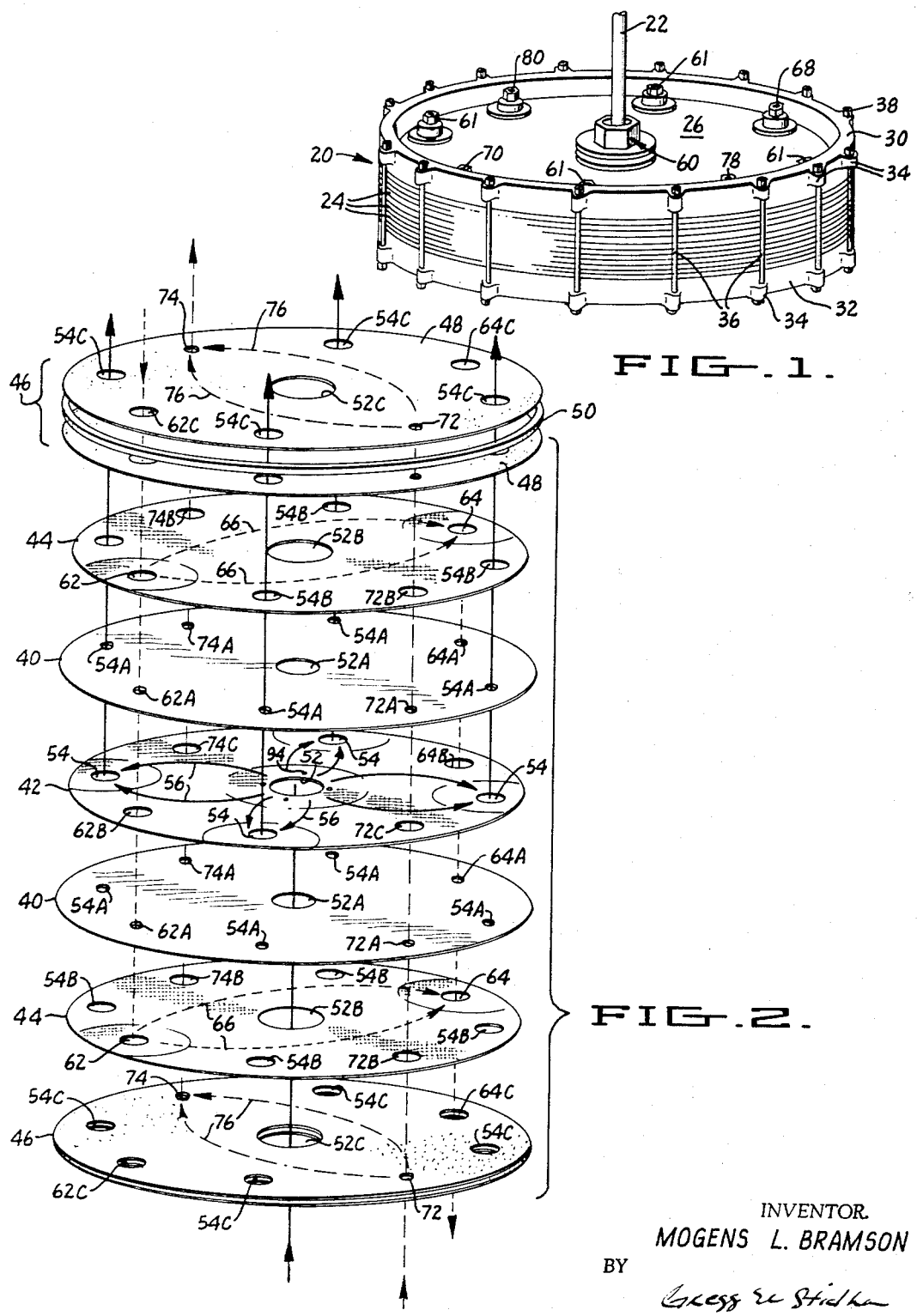

Filed June 14, 1965  6 Sheets-Sheet 2

INVENTOR
MOGENS L. BRAMSON

BY

ATTORNEYS

Nov. 26, 1968  M. L. BRAMSON  3,413,095

MEMBRANE OXYGENATOR

Filed June 14, 1965  6 Sheets—Sheet 3

INVENTOR.
MOGENS L. BRAMSON

BY

*Gregg & Stidham*

ATTORNEYS

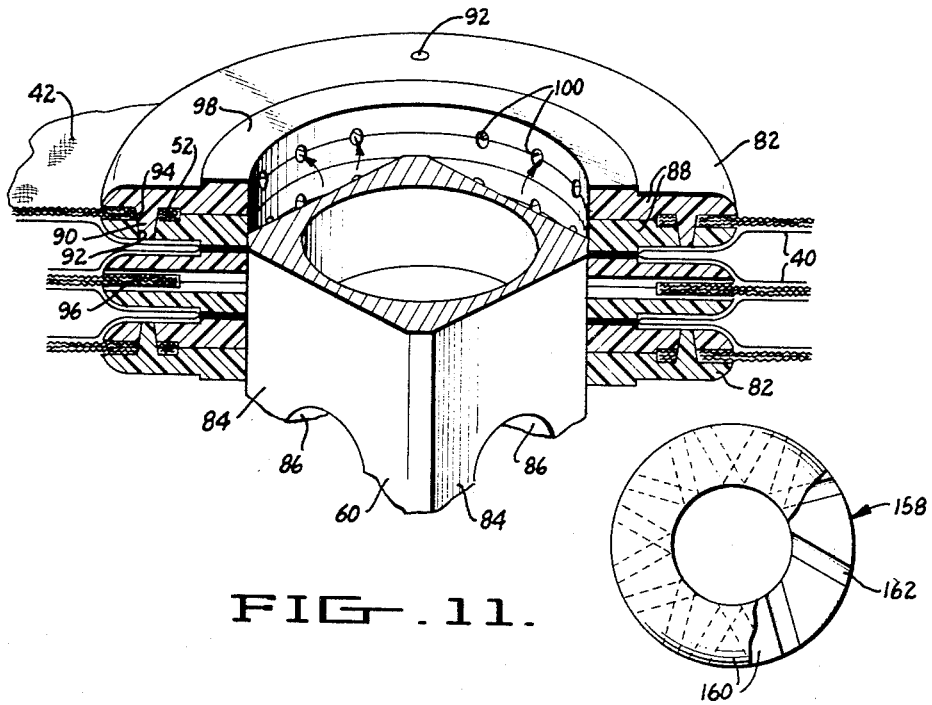
FIG. 11.
FIG. 12.
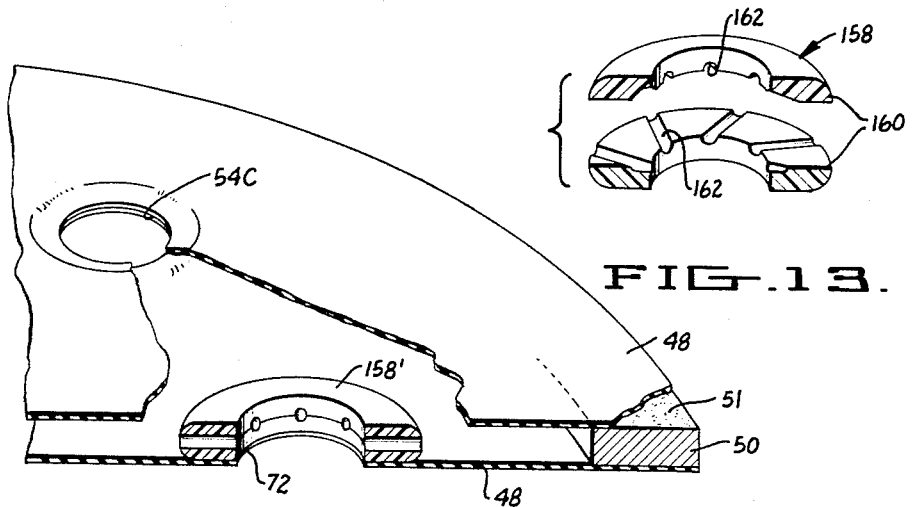
FIG. 13.
FIG. 14.

Nov. 26, 1968  M. L. BRAMSON  3,413,095
MEMBRANE OXYGENATOR

Filed June 14, 1965  6 Sheets-Sheet 5

INVENTOR.
MOGENS L. BRAMSON
BY
ATTORNEYS

Nov. 26, 1968
M. L. BRAMSON
3,413,095
MEMBRANE OXYGENATOR
Filed June 14, 1965
6 Sheets-Sheet 6
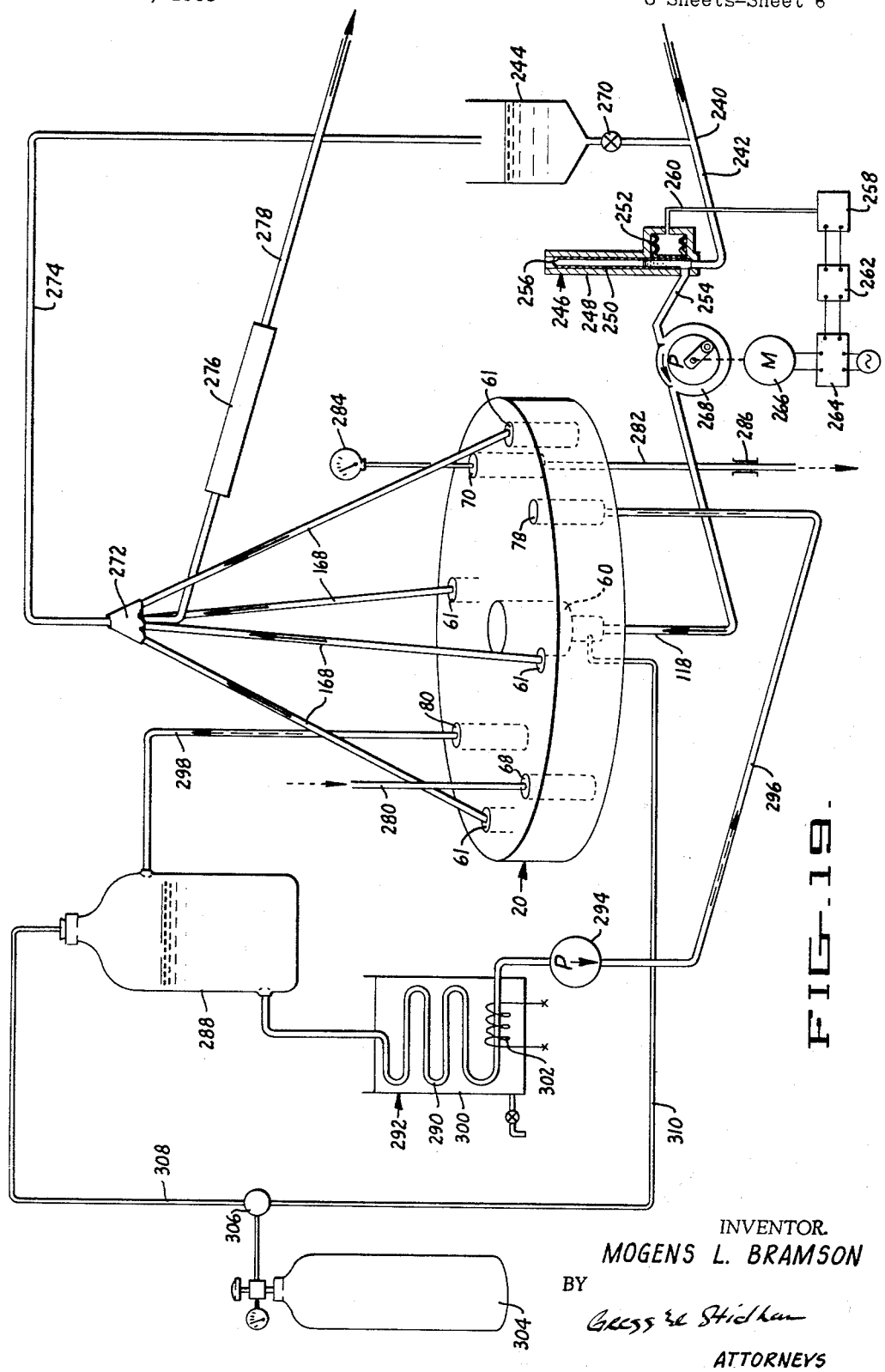
FIG_19.
INVENTOR.
MOGENS L. BRAMSON
BY
ATTORNEYS United States Patent Office 3,413,095
Patented Nov. 26, 1968

3,413,095
MEMBRANE OXYGENATOR
Mogens L. Bramson, 1134 Green St.,
San Francisco, Calif. 94109
Filed June 14, 1965, Ser. No. 463,819
17 Claims. (Cl. 23—258.5)

This invention relates to a membrane diffusion apparatus and more particularly to a membrane oxygenator for supplying oxygen to blood and removing carbon dioxide therefrom.

During surgery it is common practice to circulate venous blood from a patient through an oxygenator and to return the oxygenated blood to the patient's arteries. Bubbling and filming type oxygenators are well known in which the blood is brought into direct contact with the oxygen. However, the large raw blood-gas interfaces present in such apparatus damages the blood thereby limiting perfusions to relatively short time periods. In a membrane oxygenator, the blood and oxygen are separated by a membrane through which the oxygen to the blood and carbon dioxide from the blood diffuse, there being no direct exposure of the blood to the oxygen.

To function properly the transfer of oxygen to the blood substantially should balance the excretion of carbon dioxide from the blood. With any membrane oxygenator, a partial pressure gradient across the membrane for inducing oxygen diffusion into the blood of about 650 mm. of mercury is available, whereas the partial pressure gradient for excretion of carbon dioxide from the blood is about 50 mm. of mercury (under conditions where the partial pressure of carbon dioxide in the oxygen is maintained near zero by the use of an excess flow of oxygen over the membrane). With membranes of suitable material such as silicone-rubber or the like, carbon dioxide diffuses about 5 times more rapidly therethrough than oxygen. Consequently, oxygen diffuses about 2½ times more readily than carbon dioxide through a feasible membrane material. However, not only must the gases diffuse through the membrane but they must also pass through a boundary layer of substantially stagnant blood adjacent the membrane, which blood has a permeability to carbon dioxide which is about 33 times greater than the permeability thereof to oxygen. The apparatus of this invention is designed to substantially balance the gas exchange through the membrane.

An object of this invention is the provision of a membrane diffusion device which includes a plurality of shunt connected cells of similar design, which device may be assembled with the desired number of cells for different flow volume requirements.

An object of this invention is the provision of a membrane lung in which the transfer of oxygen to the blood substantially equals the removal of carbon dioxide therefrom.

An object of this invention is the provision of a membrane oxygenator in which blood trauma is minimized.

An object of this invention is the provision of a membrane lung in which a minimum amount of blood is required for priming purposes.

An object of this invention is the provision of a membrane oxygenator in which the dynamic resistance to the flow of blood therethrough is minimized.

An object of this invention is the provision of an oxygenator in which the blood volume remains constant notwithstanding wide variations in blod flow rates and/or pressure.

An object of this invention is the provision of a membrane oxygenator in which all of the components which contact the blood are either disposable or readily cleaned and sterilized for reuse.

An object of this invention is the provision of a membrane oxygenator with integral heat exchange for heating or cooling the blood passed therethrough.

These and other objects and advantages are obtained by means of a membrane oxygenator which is made up of a plurality of cells each of which includes a pair of spaced apart membranes between which blood flows. A foraminous spacing member or screen is used to separate the membranes and to provide turbulence in the blood flow sufficient to break up or reduce the mean thickness of the boundary layer of blood adjacent to the membrane surfaces, yet gentle enough to cause no significant hemolysis. Oxygen is flow across the outer surfaces of the membranes and diffuses therethrough into the blood. Similarly, the carbon dioxide if the blood diffuses through the members to the oxygen and is carried away by the oxygen flow. Water mattresses or jackets in the form of flexible bags with inlet and outlet passages are located at the outer sides of the membranes and are separated therefrom by foraminous spacing members through which spacing members the oxygen flows turbulently along the membranes. The water which flows through the water jackets is maintained at a higher pressure than the blood and oxygen whereby the membranes and blood and oxygen-spacing members are all clamped together into intimate contact thus in particular ensuring a constant and small blood volume in each cell. The water which is circulated through the jackets may be circulated through a heat exchanger for control of the blood temperature, if desired.

In the drawings, wherein like reference characters refer to the same parts in the several views:

FIGURE 1 is a perspective view of a multicell membrane diffusion device embodying this invention;

FIGURE 2 is an exploded perspective view of the membranes, separating elements and water jackets included in one cell of the diffusion device;

FIGURE 11 is an enlarged fragmentary perspective view of the center blood inlet manifold bolt and showing distributing rings in cross section thereon;

FIGURE 12 is an enlarged top plane view of a distributing ring of the type used on the peripherially located inlet and outlet manifold bolts;

FIGURE 13 is an enlarged exploded perspective view in section of the distribution ring shown in FIGURE 12;

FIGURE 14 is an enlarged fragmentary perspective view in section of a water mattress or jacket;

FIGURE 19 is diagrammatic view of the membrane oxygenator as employed in a blood perfusion system which includes a heat exchanger for controlling the blood temperature.

Reference is now made to FIGURE 1 wherein there is shown a membrane diffusion device designated 20 embodying this invention, which device is particularly adapted for use as an oxygenator for oxygenating venous blood from a patient during a blood perfusion. The device is generally cylindrical shaped and is suspended from a central rod 22 which may be attached thereto through a ball and socket coupling.

Figure 9:
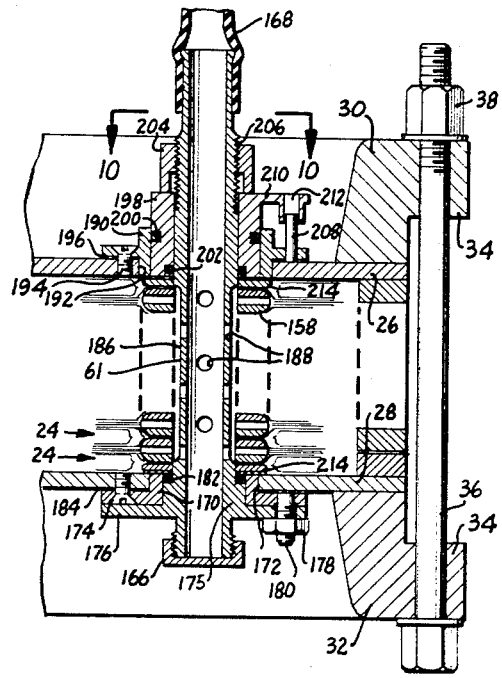
FIGURE 9 is an enlarged longitudinal sectional view through one of the blood outlet bolts.

The oxygenator comprises a plurality of cells 24 arranged in a stack between top and bottom end plates 26 and 28 (see FIGURE 9 for the bottom plate 28). The outer peripheries of the cells are clamped together into sealing engagement by top and bottom clamping rings 30 and 32 at the edge of the end plates, which rings are provided with radially extending flanges 34 having holes therein through which clamping bolts 36 extend. Nuts 38 at the upper threaded ends of the bolts clamp the rings onto the end plates 26 and 28 when tightened to effect the peripheral seal.

The cells 24 are of the same construction whereby a description of one cell applies to all of the cells. Reference is made to FIGURE 2 wherein a cell is shown comprising a pair of disc-shaped membranes 40 between which membranes a foraminous spacing element or blood screen 42 is positioned. A flow passage for the flow of fluid such as blood is formed between said membranes 40 with the height of the passage being determined by the thickness of the spacing element 42. The membranes may be made of any suitable material, and where the device is to be used as a blood oxygenator a membrane material through which oxygen and carbon dioxide readily diffuses but which is impermeable to aqueous liquids is employed. One suitable membrane material comprises woven glass fiber yarn materials about 2 mils thick which is coated or impregnated with medical grade silicone rubber to a 4 or 5 mil thickness. Such a membrane is sturdy yet readily adapted for diffusion of gases therethrough. Obviously, other suitable membrane materials may be employed in the oxygenator without departing from this invention.

A pair of foraminous oxygen screen spacing elements 44 of identical construction is included in each cell, with one such spacing element in abutting relation with each of the membranes 40 at the membrane surface opposite the blood screen spacing member 42. Water mattresses or jackets 46 abut the oxygen screen spacing elements at opposite sides of the cell. As will become apparent hereinbelow water mattresses are located at the top and bottom of the stack of cells and intermediate adjacent cells in the stack. As seen in FIGURE 2, the water mattresses 46 and membranes 40 are of a larger outside diameter than the spacing members 42 and 44 whereby, in a cell stack, the water mattresses and membranes, but not the spacing members are peripherially clamped together by said clamping rings 30 and 32 for sealing engagement therebetween. Shunt connected flow passages for the flow of fluid such as oxygen are formed between the water mattresses and membranes with the height of such passages being determined by the thickness of the oxygen screen spacing elements 44.

Each water mattress 46 comprises a pair of flexible end wall members 48 and an intermediate side wall in the form of a narrow ring 50. The flexible wall members are made of a liquid impervious materials such as polyvinyl chloride sheet material about .010 inch thick cemented (as by cement 51 shown in FIGURE 14) or otherwise suitably secured to said annular member 50. A water tight engagement between the ring 50 and walls 48 need not be provided by the cement since a sealing engagement therebetween is provided by the clamping rings 30 and 32.

Figure 3:
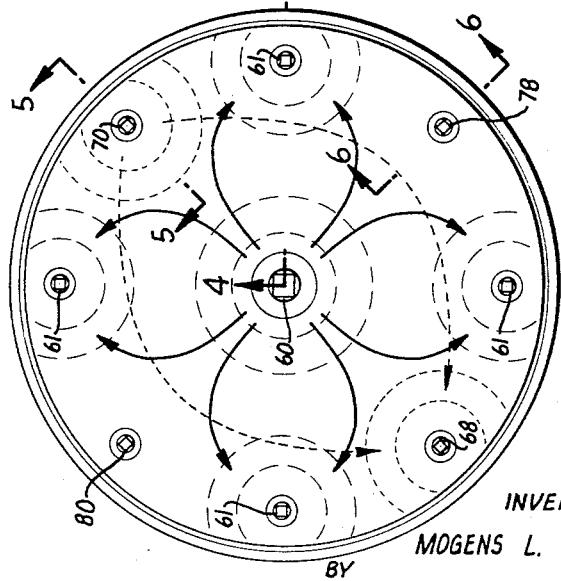
FIGURE 3 is a top plan view of the cell shown in FIGURE 2 and showing also manifold inlet and outlet bolts extending therethrough.

The blood screen spacing member 42, through which the blood generally radially flows between the membranes 40 is provided with a central blood inlet opening 52 and four blood outlet holes 54 in quadrature spaced relation adjacent the outer edge thereof. The blood flows from the aperture 52 through the foraminous spacing member 42 to the apertures 54 along the general direction of the solid line arrows 56, with the membranes 40 forming the upper and lower walls of the blood flow passage. Central holes 52A, 52B and 52C are formed in the membranes 40, oxygen screen spacng elements 44 and mattresses 46, respectively, in axial alignment with the aperture 52 in the blood screen spacing element, through which holes a blood inlet manifold bolt 60 (shown in FIGURES 3, 4, 7 and 11) extends for the delivery of blood to the blood flow passages of each cell of the oxygenator in parallel in a manner described below. Also, quadrature spaced 54 in the blood screen spacing member, through which holes 54A, 54B and 54C are formed in the membranes 40 tresses 46, respectively in axial alignment with the holes holes blood outlet manifold bolts 61 extend (see FIGURES 3, 4 and 9) for the discharge of blood from the 40, oxygen screen spacing elements 44 and water matblood flow passages.

Each of the oxygen screen spacing members 44 through which oxygen is adapted to flow is provided with oxygen inlet and outlet openings 62 and 64, respectively, at diametrically opposite edges thereof. Oxygen flows from the aperture 62 through the foraminous oxygen screen spacing member 44 to the diametrically opposite aperture 64 along the general direction of the broken line arrows 66, with the membrane 40 and adjacent water mattress 46 forming the top and bottom walls of the oxygen flow passage. Apertures 62A, 62B and 62C are formed in the membranes 40, blood screen separating member 42 and water mattresses 46, respectively, in axial alignment with the apertures 62 in the oxygen screen spacing members 44 through which apertures an oxygen inlet manifold bolt 68 (see FIGURE 3) extends for delivery of oxygen to the oxygen flow passages. Similarly, apertures 64A, 64B and 64C are formed in the membranes 40, blood screen spacing member 42 and water mattresses 46, respectively, in axial alignment with the apertures 64 through which apertures an oxygen outlet manifold bolt 70 (see FIGURES 3 and 5) extends for discharge of oxygen from the oxygen flow passages.

The water mattresses 46, through which a heat exchange fluid such as water is adapted to flow, are each provided with water inlet and outlet openings 72 and 74, respectively, at diametrically opposite sides thereof in quadrature spaced relation to the apertures 62C and 64C formed therethrough. Water is adapted to flow from the aperture 72 to the aperture 74 between the walls 48 of the mattress generally along the direction of the arrows 76. Apertures 72A, 72B and 72C are formed in the membranes 40, oxygen screen separating members 44 and blood screen separating member 42, respectively, in axial alignment with the apertures 72 through which a water inlet manifold bolt 78 (see FIGURES 1, 3 and 6) extends for circulation of water to the mattresses. Similarly, apertures 74A, 74B and 74C are formed in the membranes 40, oxygen screen separating members 44 and blood screen separating member 42, respectively, in axial alignment with the apertures 74 through which a water outlet manifold bolt 80 (see FIGURES 1 and 3) extends for discharge of water from the mattresses. The water mattress walls 48 are sealed together as by heat sealing or other suitable means about the periphery of the apertures 52C, 54C, 62C and 64C to prevent passage of water into the blood and oxygen flow passages thereat (see FIGURES 4, 5 and 15).

Reference is now made to FIGURE 11 wherein there is shown a fragmentary portion of the blood inlet manifold bolt 60 upon which distribution rings 82 are mounted for distributing blood from the manifold bolt 60 to the blood flow passages between the membranes 40 occupied by the foraminous blood screen spacing element 42. Briefly, the section of the generally cylindrical shaped manifold bolt 60 shown in FIGURE 11 has four (4) flat surfaces 84 formed thereon with only small fragments of the cylindrical shape remaining at the four corners thereof. Blood is introduced into the bottom of the bolt 60, flows radially outwardly through passages 86 and then flows upwardly to fill the area betwen the exterior of the bolt and the inside walls of the distributing rings 82. The manifold bolt 60 is shown in greater detail in FIGURE 7 and described hereinbelow. The distributing rings 82 may be made of a suitable plastic such as molded polyethylene and are shown formed of two identical ring shaped parts 88 each of which is provided with a pair axially extending pins or studs 90 at diametrically opposite points thereon, and a pair of apertures 92 in quadrature relation with the pins. Pin receiving holes 94 are formed about the inner periphery 52 of the blood screen separating member 42 (as seen also in FIGURES 2 and 15) through which holes the pins extend to maintain the blood screen separating or spacing member 42 in proper position thereat. The pins 90 extend through the holes 94 and into the cooperating holes 92 to securely anchor the blood screen separating member. An annular recess 96 is formed at the outer edge along the abutting faces of the ring sections 88 into which the inner periphery of the blood screen separating member extends. Also, an annular, slightly raised facing 98 is formed on the outer face of the ring sections 88 along the inner periphery thereof, between which raised facings the membranes 40 of adjacent cells are clamped into sealing engagement. Radial apertures 100 extend through the rings 82 from the inner periphery thereof to the grooves 96 at the outer periphery for passage of fluid from the manifold bolt ot the inner periphery of the foraminous blood screen spacing element 42 between the pair of membranes 40 of each cell. As mentioned above, the membranes 40 at opposite sides of each distribution ring 82 are tightly clamped together between adjacent rings along the raised facings 98 to prevent leakage of blood thereat. Clamping means are included on the blood inlet manifold bolt 60 and described hereinbelow.

Figure 7:
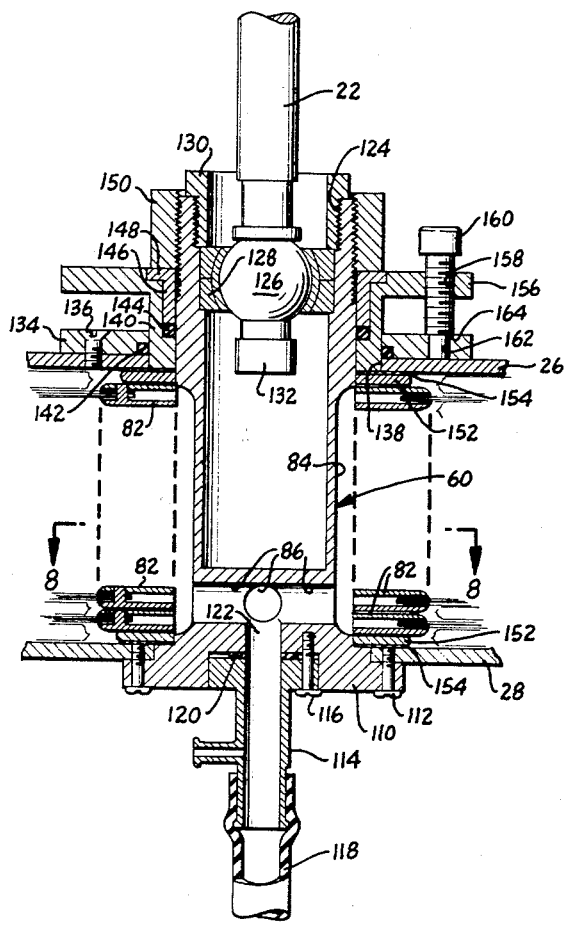
FIGURE 7 is an enlarged longitudinal sectional view through the central blood inlet manifold bolt.

Reference is now made to FIGURE 7 wherein the blood inlet manifold bolt 60 is shown provided with a radial flange 110 which abuts the bottom of the lower end plate 28 and is attached thereto by screws 112. A blood inlet tubing connector 114 is attached by screws 116 to the bottom of the bolt for connection thereof to a source of venous blood through a flexible tubing 118. A gasket 120 provides a fluid tight seal betwen the connector 114 and manifold bolt 60. The connector 114 communicates with an axial passage 122 in the bottom of the bolt which in turn terminates in the radial passages 86 for the flow of blood from the connector to the outside of the blood manifold bolt at the flat surfaces 84. As seen in FIGURE 7 the flat surfaces 84 extend between the lower and uppermost distributing rings 82, and below and above such rings the bolt is generally cylindrical shaped.

The upper end of the blood inlet manifold bolt 60 is hollow and has internal threads 124 formed at the top thereof. A spherical bearing member comprising a ball 126 and socket 128 is provided within the bolt. The socket 128 seats upon a shoulder in the bolt and is held thereagainst by a threaded bearing mounting sleeve 130 which engages the threads 124 with the end of the sleeve in abutting relation with the socket. The lower end of the rod 22 is threaded and extends through and is fastened to the ball 126 by a nut 132 at the lower end of the rod. The upper end of the rod is supported by any suitable means not shown for suspension of the membrane oxygenator. The ball and socket connection permits tilting of the oxygenator in all directions, and when the oxygenator is being filled with blood prior to a perfusion it is tilted in all directions to assure a complete filling of the blood flow passages and the elimination of air pockets therein.

A seal ring retainer plate 134 is fastened by screws 136 to the outer surface of the upper plate or wall 26 at the central aperture 138 therein. An axially slidable force transmitting sleeve 140 extends through the retainer plate 134 and the aperture 138, and a groove in the retainer plate 134 accommodates a seal ring 142 for sealing engagement between said sleeve and retaining plate.

The sleeve 140 is slidable along the manifold bolt 60, with a sealing engagement therebetween being provided by a seal ring 144. The seal ring 144 seats on a shoulder on the sleeve 140 and is maintained in position thereon by a seal retaining sleeve 146. A flange 148 at the upper end of the retaining sleeve 146 abuts the top of the force transmitting sleeve 140 to limit the width of the groove in which the seal ring 144 seats. A nut 150 in threaded engagement with the upper threaded end of the manifold bolt 60 bears against the retainer sleeve 146 to press the same and the force transmitting sleeve 140 downwardly as the nut is tightened. The cells of the membrane diffusion device are stacked between the end plates 26 and 28 with a metal washer 152 and gasket 154 at the bottom and top of the stack. By tightening the nut 150 pressure is applied through the seal retaining sleeve 146, force transmitting sleeve 140 and upper washer 152 and gasket 154 to the stack to provide a sealing engagement between the distributing rings 82 and the membranes 40.

In use, the blood and water are circulated through the device under pressure thereby tending to bulge the plates 26 and 28. (The pressure of the oxygen which is passed through the device is near atmospheric and does not contribute to the bulging load.) To prevent such bulging, the force transmitting sleeve 140 is provided with a radial flange 156 having tapped holes 158 therein to receive adjusting bolts 160. The ends of the bolts 160 are of reduced diameter and are freely rotatable in apertures 162 formed in the retaining plate 134, with a shoulder 164 on the bolts abutting the top of the plate. When the bolts 160 are tightened the retaining plate 134 and attached top plate 26 are moved axially along the sleeve 140 toward the bottom plate 28 to eliminate bulging of the plates thereat and to maintain the same in parallelism. The bolts 160 also prevent rotation of the force transmitting sleeve 140 as the nut is tightened whereby only an axial force is transmitted by said sleeve.

Figure 6:
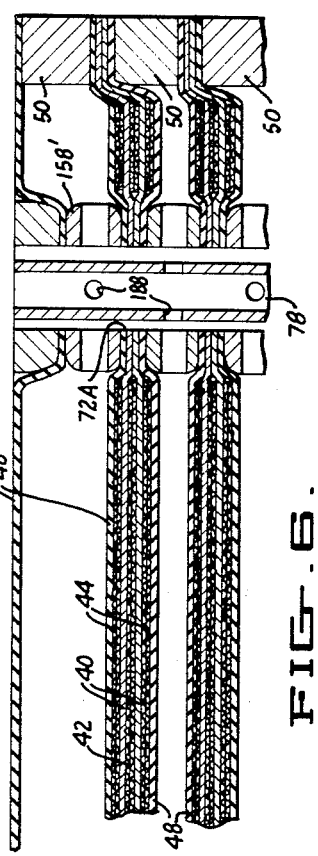
FIGURE 6 is an enlarged sectional view take on line 6—6 of FIGURE 3.

The various inlet and outlet manifold bolts spaced about the periphery of the cells, i.e., the blood outlet bolts 61, oxygen inlet and outlet bolts 68 and 70, respectively, and water inlet and outlet bolts 78 and 80, respectively, are all of the same construction but are provided with different reference characters for purposes of identification and description. The blood outlet and oxygen inlet and outlet manifold bolts are provided with a plurality of distributing and collecting rings 158 through which the respective fluids flow from and to said manifold bolts. Referring to FIGURES 9, 12 and 13 the rings 158 are shown formed of two identical ring shaped parts 160 which when placed together face to face form the ring 158. Generally radial grooves 162 are formed along the abutting faces of the ring sections, which groves extend from the inner to the outer periphery of the ring for communication therebetween and through which grooves fluid may easily pass. The distributing and collecting rings 158 employed with the water inlet and outlet manifold bolts 78 and 80 are of substantially the same construction as the rings 158 but are made slightly thinner and of a slightly harder material, such as polypropylene, the thinner rings being designated 158' as seen in FIGURES 6 and 14.

Figure 10:
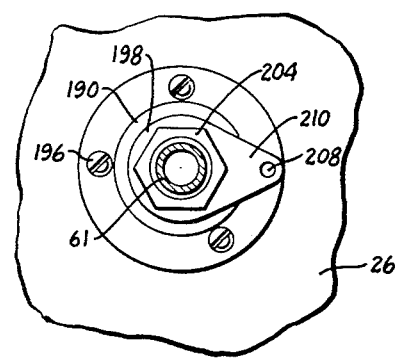
FIGURE 10 is a sectional view taken on line 10—10 of FIGURE 9.

Reference is now made to FIGURES 9 and 10 wherein the blood outlet manifold 61 is shown. As mentioned above the other peripherally located manifold bolts are of the same construction and the description of one bolt applies to them all. The bolt 61 is of tubular shape and is shown provided with an end cap 166 to seal one end, which cap may be removed for cleaning the bolt. Also, a connector may be provided thereat in place of the cap for coupling the bolt to a pressure gauge or other device if desired. Further, either end of the bolt may be capped, as desired. In the illustrated arrangement a flexible tube 168 is shown fitted to the top of the bolt to carry the oxygenated blood from the apparatus.

A flanged seal retainer ring 170 extends through the aperture 172 in the bottom plate 28 and is attached to the plate by bolts 174 extending through the flange thereon and threadedly engaging tapped holes in the bottom of the plate 28. A flange 176 is formed on the manifold bolt 61 which abuts the ring 170 and is fastened thereto by nuts 178 which engage threaded studs 180 attached to the ring 170 and extending through holes in the flange. The bolt 61 has an enlarged diameter portion 175 adjacent the flange 176 which fits within the ring 170, and a shoulder is formed at the upper end of the flange upon which a seal ring 182 seats to provide sealing engagement between the bolt 61 and ring 170. A gasket 184 is provided between the ring 170 and bottom plate 28 to seal the same together thereat.

Figure 8:
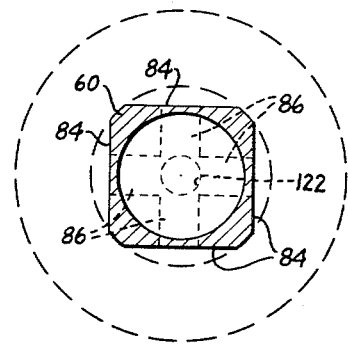
FIGURE 8 is a sectional view taken on line 8—8 of FIGURE 7.

The generally cylindrical shaped bolt 61 is formed with four flat sides 186 in the form of a square along an intermediate portion thereof, which flat sides extend from the lower cell to the upper cell. The cross section of the bolt 61 at the flat sides 186 in similar to that of the blood inlet manifold bolt 60 shown in FIGURES 7, 8 and 11 and described above. Apertures 188 are formed through the walls of the bolt at the flat sides 186 for communication between the inside of the bolt and the inside of the distribution rings 158 mounted thereon. The inside diameter of the rings 158 substantially equals the diameter of the bolt 61.

A cylindrical sleeve 190 extends through the aperture 192 in the top plate 26 and is attached to the plate by bolts 194 which extend through holes in a flange on the sleeve and engage tapped holes in the plate 26. A gasket 196 at the bottom of the flange provides a sealing engagement between the sleeve 190 and top plate 26. A generally tubular shaped force transmitting sleeve member 198 is positioned between the sleeve 190 and manifold bolt 61 which sleeve is axially slidable therebetween. Seal rings 200 and 202 in annular grooves in the outer and inner surfaces of the force transmitting member 198 provide a sealing engagement between said member and the sleeve 190 and bolt 61, respectively. A nut 204 on the threaded end 206 of the manifold bolt 61 engages the top of the force transmitting member 198 to axially slide the same downwardly along the bolt as the nut is tightened. Rotation of the presure transmitting member 198 upon rotation of the nut 204 is prevented by a pin 208 which is fixed to and extends upwardly from the flange of the sleeve 190. A radially extending arm 210 with an aperture 212 therein is provided on the force transmitting member 198 into which aperture the pin 208 extends to prevent relative rotation therebetween. The bolt 61 extends through the stacked cells 24 of the membrane device, and washers 214 are provided at the top and bottom of the stack adjacent the top plates 26 and 28. By tightening the nut 204 pressure is applied through the member 198 and upper washer 214 to the stack of cells to provide a sealing engagement between the distribution rings 158 and any of the cell elements sandwiched therebetween.

Figure 4:
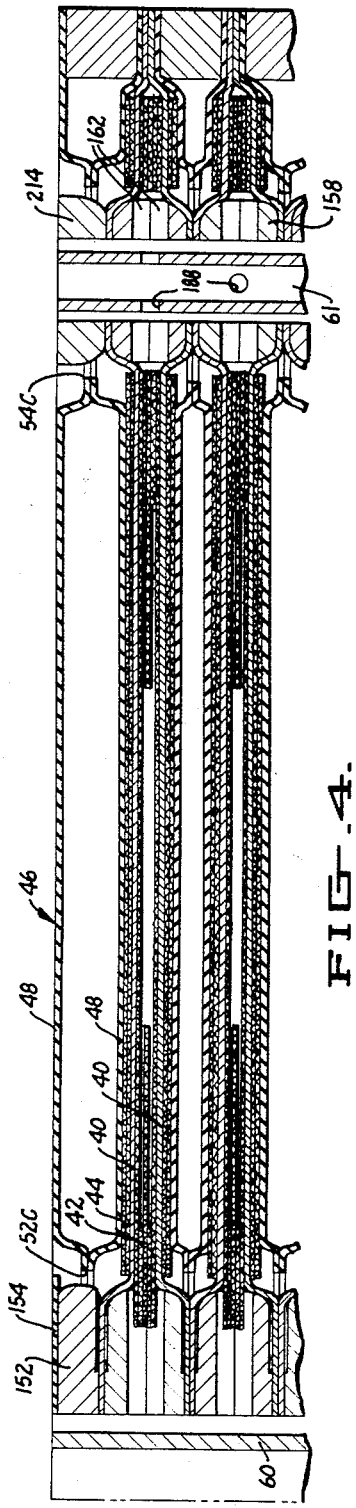
FIGURE 4 is an enlarged sectional view taken on line 4—4 of FIGURE 3.

The arrangement of the distribution rings 158 and the cell elements is the same at the blood outlet manifold bolt 61 as at the blood inlet manifold bolt 60 described above. Briefly, as seen in FIGURE 4, the rings 158 are shown positioned between the membranes 40 of the individual cells, and the membranes and rings are clamped together into sealing engagement. Blood in the blood flow passage between the membranes 40 of the individual cells flows through the foraminous separating means 42 and enters the blood outlet bolt 61 through the grooves 162 in the ring 158.

Figure 15:
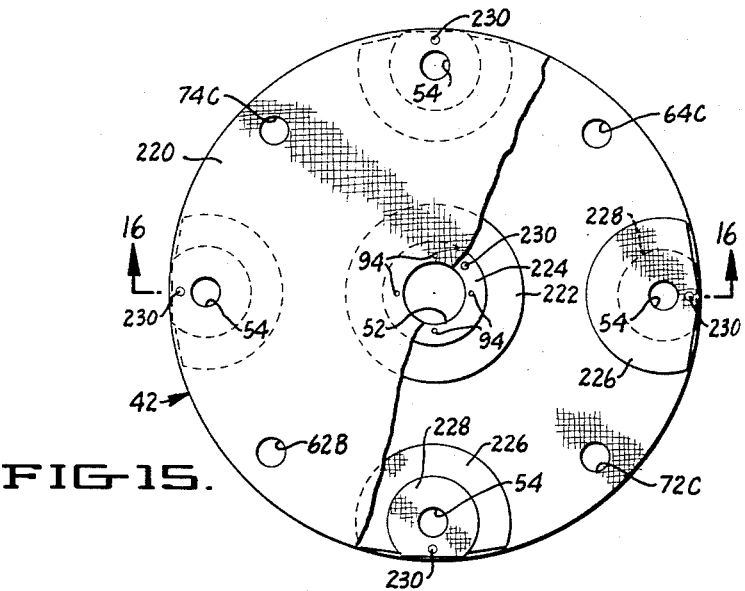
FIGURE 15 is a top plane view of a blood screen separating member with a portion thereof shown broken away for clarity.
Figure 16:
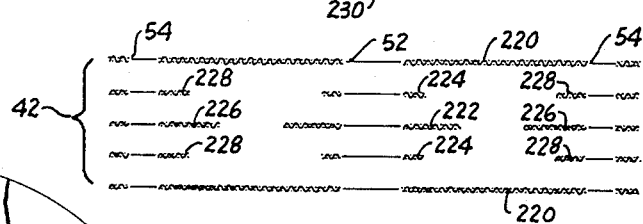
FIGURE 16 is an exploded cross sectional view taken on line 16—16 of FIGURE 15.

To prevent throttling of the blood adjacent the blood inlet and outlet manifold bolts, the blood screen separating means 42 are made if increased thickness adjacent said inlet and outlet to increase the height of the blood flow passage thereat. Reference is made also to FIGURES 15 and 16 wherein a blood screen separating member 42 is shown comprising top and bottom full size screen members 220 between which are located smaller sized screen sections at the central aperture 52 and at the peripheral apertures 54. The central sections comprise a center annular screen member 222 with smaller diameter annular members 224 at opposite sides thereof between the top and bottom members 220 and said center member 222. A similar arrangement of a center screen 226 and smaller intermediate screens 228 is included at each of the blood outlet apertures 54. The peripherial screens sections are of slightly smaller diameters than the centrally located screen sections and are trimmed along one side to correspond to the contour of the edges of the top and bottom screen members 220. The top and bottom screen 220 with the smaller screen sections therebetween are secured together as at 230 by heat sealing as by pressing the same together between heated, flat, elements of a suitable sealing tool. With water under pressure applied to the water jacket or mattresses 46 in the manner described below, the membranes 40 are pressed into intimate contact with the block screen separating means 42 positioned therebetween. The height of the blood flow passages between the membranes is thereby determined by the thickness of the blood screen separating member 42 which thickness, of course, varies with distance from the inlet and outlet passages by reason of the inclusion of the blood screen sections 222, 224, 226 and 228 in the construction thereof. Such "anti-restriction" screen sections may be made of the same woven glass fiber yarn as the top and bottom walls 220 of the screen. (In the cross sectional views of FIGURES 4 and 5 the device is shown without water, blood or oxygen being supplied thereto, and hence the membranes and screens are not shown pressed into intimate contact therein.)

Not only do the blood screen separating members 42 serve to define the blood flow passage height, but they also serve to break up the stagnant plasma boundary layer which would ordinarily occur at the surface of the membrane. Instead of a smooth flow, a gently turbulent flow of blood is effected by the blood screen separating members. The stagnant boundary layer of plasma adjacent the membrane surface is thereby reduced to facilitate diffusion of the oxygen and carbon dioxide therethrough. Therefore, with this invention not only are thin blood flow passages along the membranes provided, but the thin layer of blood which flows therealong is also agitated to minimize the boundary layer and to improve the diffusion of gases into and from the blood. Furthermore said blood screen separating members 92 also serve to compel the blood to distribute itself evenly over the entire surface of each membrane to eliminatet "channeling" or stratification of the blood.

Figure 5:
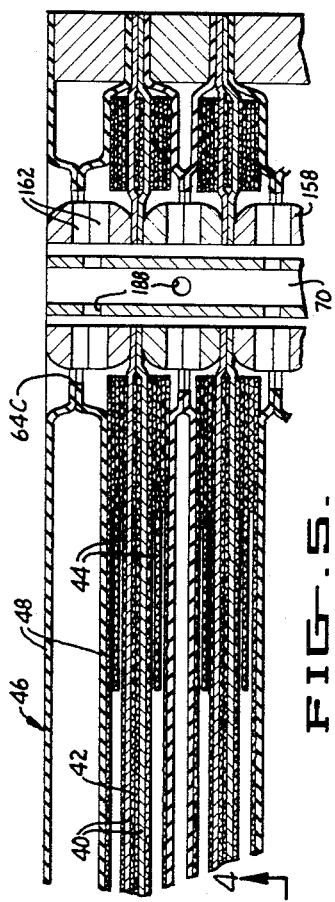
FIGURE 5 is an enlarged sectional view taken on line 5—5 of FIGURE 3.

Reference is now made to FIGURE 5 wherein the stacking arrangements of the rings 158 and other cell elements for the oxygen outlet manifold bolt 70 is shown. (An identical stack is provided at the oxygen inlet bolt 68 not shown in FIGURE 5.) It will be seen that the membranes 40 of the individual cells are clamped together in sealing engagement between adjacent rings 158 to seal off the blood passages therefrom. The walls of the water mattresses or jackets 46 at the apertures 64C therein are also sealed together in the manner described above. Thus, oxygen from the oxygen inlet manifold bolt 60 passes through the distribution rings 158 on said bolt, flows through the oxygen flow passages formed between the outer face of the membranes 40 and the water jackets or mattresses, and into the oxygen outlet bolt 70 through the grooves 162 in the rings 158 thereat.

Figure 17:
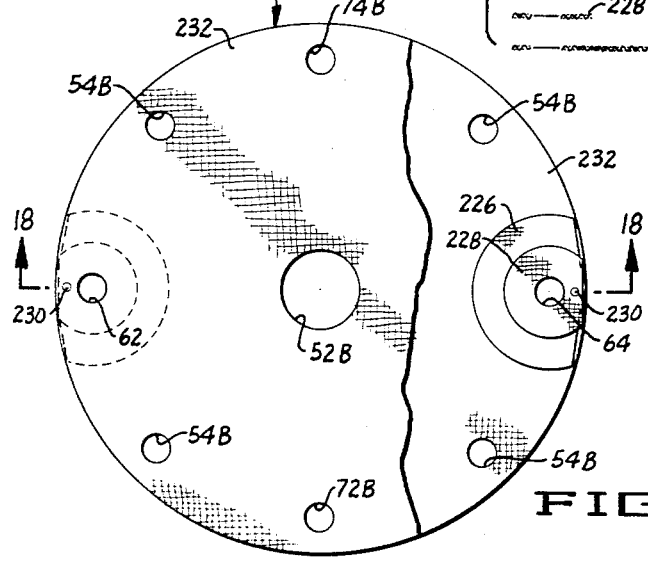
FIGURE 17 is a top plane view of an oxygen screen separating member with a portion shown broken away for clarity.
Figure 18:
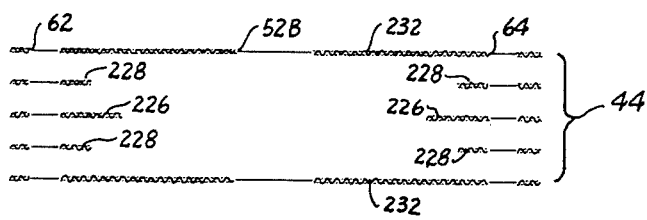
FIGURE 18 is an enlarged cross sectional view taken on line 18—18 of FIGURE 17.

The oxygen screen separating means 44 through which the oxygen flows are of a construction similar to the blood screen separating means 42 described above. Throttling of the oxygen in passage through the oxygen screen separating members is prevented or reduced by forming said members of an increased thickness adjacent the inlet and outlet apertures. Referring to FIGURES 17 and 18 an oxygen screen separating member 44 is shown comprising top and bottom full sized screen members 232 with a center and intermediate screen sections 226 and 228 at the oxygen inlet and outlet apertures 62 and 64, all of which members are secured together by heat sealing as at 230 in the manner described above with reference to the blood screen separating means. With water under pressure applied to the water jackets or mattresses 46, each oxygen screen separating means 44 is pressed between a water jacket wall 48 and membrane 40 into intimate contact therewith. The height of the oxygen flow passages is thereby determined by the thickness of the oxygen screen separating member 44, which thickness varies with distance from the inlet and outlet apertures. The oxygen separating members 44 may be made of the same woven fiber glass material as the blood screen separating means 42, if desired. With this arrangement the oxygen flow passages may be made thin to increase the linear speed of oxygen flow during use in a blood perfusion and thus minimizes the average partial pressure of carbon dioxide in the gas circuit. Also, the turbulence which results from the flow of oxygen through the screen minimizes the stagnant oxygen boundary layer along the membrane thereby improving the gas exchange capacity of the apparatus.

The flow path of the water to the water mattresses will now be described with reference to FIGURES 6 and 14 wherein it is seen that the distributing rings 158' are positioned inside the water jackets or mattresses between the flexible walls 48 thereof. The rings are preferably placed between the walls prior to assembly of the mattresses and may be secured in position at the inlet and outlet apertures 72 and 74, if desired. The membranes 40 of each cell are clamped together at the periphery of the holes 72A therein between the walls 48 of adjacent mattresses to seal off the oxygen and blood flow passages thereat from each other and from the water supply. The stacking order of rings 158' and other cell elements at the water outlet bolt 80 is the same as that for the water inlet bolt 78 shown in FIGURE 6. It will be noted that the rings 158' are not as thick as the rings 158 since both mattress walls 48 and membranes 40 must be clamped therebetween, whereas only membranes 40 are clamped between the rings 158.

Reference is now made to FIGURE 19 wherein there is diagrammatically shown blood, oxygen and water flow paths for the membrane oxygenator and suitable control means for control of the fluid flow therethrough. Venous blood from the patient enters a T-connector 240 in the line 242 between a priming reservoir 244 and pressure sensing device 246. The pressure sensor comprises a housing 248 within which is located first and second flexible bladders 250 and 252 made of suitable material such as plastic. Venous blood from the patient is fed into the bladder 250 through the line 242 and is discharged therefrom through the line 254. An opening 256 is provided at the upper end of the bladder 250 to vent the same to the atmosphere. The second bladder 252 which is filled with a fluid such as air, and sealed, connects to a pressure transducer 258 through a line 260. The bladders are arranged in separate compartments of the housing 248 in abutting relation with each other whereby the pressure within the second bladder 252 equals the hydrostatic head of the blood within the first bladder. The transducer output is thereby proportional to the level of the blood in the bladder 250. The output from the transducer is coupled through a suitable amplifier 262 to a control circuit 264 for control of the voltage to a pump motor 266 for control of the motor speed. The motor shaft is coupled to a veno-arterial pump 268 for driving the same. The pump inlet is coupled to the bladder 250 through the line 254 and the pump outlet is coupled to the blood inlet manifold bolt 60 of the oxygenator through a line 118. Venous blood is thereby supplied to the oxygenator by the variable speed pump 268 at a rate equal to the rate of venous outflow from the patient. The system is initially primed with blood from the reservoir 244 and when priming is completed a clamp 270 on the reservoir line is closed. With the novel oxygenator of this invention only one pump is required in the entire blood circuit thereby minimizing hemolysis produced by pumping of the blood.

The blood transverses the cells of the oxygenator in parallel, emerges from the four blood outlet manifold bolts 61 into the tubes 168 which in turn feed into a disposable bubble trap 272. Suitable clamping means, not shown, are provided at the outlet from the bubble trap to either direct the oxygenated blood back to the priming reservoir 244 during priming through the line 274 or to the patient through a disposable tubular filter 276 and arterial line 278.

Oxygen is supplied to the oxygen inlet bolt 68 through a line 280 from any suitable supply source not shown, such as a tank of compressed oxygen. In the oxygenator, the oxygen passes through the cells thereof in parallel and emerges at the oxygen outlet manifold bolt 70. The oxygen, together with the carbon dioxide diffused therein from the blood, is discharged through a flexible tube 282 attached to the oxygen outlet manifold bolt 70. A pressure gauge 284 may be coupled to the other end of the manifold bolt 70 to provide an indication of the oxygen discharge pressure. If desired, an adjustable clamp 286 may be provided on the discharge tube 282 and by tightening the clamp the gas flow through the tube 282 may be throttled to increase the oxygen outlet pressure if desired. To keep the pressure of the carbon dioxide in the gas near zero a large excess flow of pure oxygen is ordinarily provided. An oxygen flow rate of about 15 liters per minute is typical during perfusion of an adult.

Water or other suitable heat exchange fluid from a sealed pressurized container 288 flows from the bottom of the container through a coil 290 in a heat exchanger 292 to a centrifugal pump 294. From the pump 294 it is fed through a line 296 to the water inlet manifold bolt 78 from whence it flows through the water mattresses or jackets of the oxygenator in parallel. The water emerges from the water outlet manifold bolt 80 and passes through a line 298 and re-enters the sealed container adjacent the upper end thereof. The tank 300 of the heat exchanger 292 may be filled with warm, cold or ice water as desired for control of the temperature of the heat exchanger fluid flowing through the coil 290. Also, an electric heating element 302 may be included therein for warming of the water or maintenance of normothermia of the blood in the oxygenator.

As mentioned above, the water pressure in the water jackets or mattresses is higher than the pressure of the blood and oxygen within the oxygenator to press the walls of the mattresses and membranes into intimate contact with the foraminous screen separating members. As seen in FIGURE 19 the sealed container 288 (and hence the entire water flow circuit) is pressurized by connection of a source of gas 304 under pressure thereto through a differential pressure controlled valve 306 and line 308. Gas such as air is suitable for pressurizing the container. A blood pressure sensing line 310 connects the blood inlet manifold bolt 60 to the differentially controlled valve 306. The valve 306 functions to supply gas to the container 268 at a constant differential pressure greater than the pressure of the blood entering the oxygenator. This arrangement prevents bulging of the oxygenator blood cells, and thus maintains a constant blood volume in the oxygenator notwithstanding wide variations in blood flow rates and pressures. This is important for accurate control of the patient's blood volume.

After each blood perfusion, the oxygenator is completely disassembled and all of the plastic parts which have been in contact with blood, i.e., the membranes 40, blood screen separating member 42 and distributing rings 152 and 158 on the blood inlet and outlet manifold bolts are discarded. The blood inlet manifold bolt 60 and outlet manifold bolts 61 are physically and chemically cleaned. The oxygenator is then reassembled with new clean membranes, blood separating members, etc., and tested for internal leakage by application of pyrogen-free water in the blood circuit. It is then drained and dried in vacuo and gas sterilized with ethylene oxide or other suitable gas, after which it is again ready for use.

As mentioned above, the oxygenator may be constructed of any desired number of cells 24. An oxygenator with a small number of cells, for example, four cells will have a very small blood priming volume. This, together with the fact that a precise, constant, extra-corporeal blood volume may be circulated permits safe perfusion of infants. Because of the low priming volume the oxygenator advantageously may be used with hemo-dilution in part or complete substitution for priming with donor blood.

Instead of an oxygenator, the apparatus may be used primarily as a heat exchanger, where deep hypothermia and rapid temperature changes are required. Further, with this device prolonged circulatory support by partial veno-arterial perfusion, with oxygenation, is possible. With different membrane materials it may also be used as an artificial kidney, dialyzer, or the like.

The invention having been described in detail in accordance with the requirements of the Patent Statutes, various changes and modifications may suggest themselves to those skilled in this art without departing from the spirit and scope of the inevntion as defined by the appended claims.

I claim:
1. A membrane diffusion device comprising:
a membrane,
first and second foraminous spacing members at opposite sides of said membrane,
means forming a first flow passage for the flow of a first fluid through said first spacing element along one side of said membrane,
means forming a second flow passage for the flow of a second fluid through said second spacing element along the other side of said membrane,
and means for pressing said spacing elements and membrane together into a stack to limit said flow passages to substantially the thickness of said spacing elements.

2. The membrane diffusion device as defined by claim 1 wherein said membrane comprises a silicone rubber coated glass fiber fabric.

3. A membrane diffusion device comprising:
a liquid impervious membrane through which gas diffuse,
first and second foraminous spacing members at opposite sides of said membrane for the relatively free, turbulent, flow of fluids therethrough,
means forming a first flow passage for the turbulent flow of a first fluid through said first spacing element along one side of said membrane,
means forming a second flow passage for the turbulent flow of a second fluid through said second spacing element along the other side of said membrane,
and means for pressing said spacing elements and membrane together into a stack to limit said flow passages to substantially the thickness of said spacing elements.

4. The membrane diffusion device defined by claim 3 for use in an arrangement for extra-corporeally oxygenating the venous blood of a living animal,
said arrangement including means for circulating the blood through said first flow passage, and
means for passing oxygen through said second flow passage,
the diffusion of oxygen through said membrane into the blood substantially equaling the diffusion of carbon dioxide from the blood through said membrane into said oxygen.

5. The membrane diffusion device defined by claim 3 wherein said means for pressing said spacing elements and membrane together includes a flexible fluid container adapted to be supplied with fluid at a pressure greater than the pressure of the fluids in said first and second flow passages.

6. The membrane diffusion device defined by claim 5 for use in an arrangement for extra-corporeally oxygenating and controlling the temperature of the venous blood of a living animal,
said arrangement including means for circulating the blood through said first flow passage,
means for passing oxygen through said second flow passage, and
means for circulating a temperature controlled heat exchange fluid through said container to control the temperature of said blood flowing in said first flow passage.

7. The membrane diffusion device defined by claim 5 including means for circulating a heat exchange fluid through said container for temperature control of fluids in said first and second flow passages.

8. The membrane diffusion device defined by claim 3 wherein said membrane is of generally circular shape, and including inlet and outlet means for said first and second flow passages positioned whereby the first fluid is adapted to flow generally radially along said membrane and the second fluid is adapted to flow generally diametrically across said membrane.

9. The membrane diffusion device defined by claim 3 wherein at least one of said spacing elements is of a non-uniform thickness to provide a non-uniform flow passage height therethrough.

10. The membrane diffusion device defined by claim 3 including inlet and outlet means for said flow passages, at least one of said spacing elements being of an increased thickness adjacent the inlet and outlet means of one flow passage to reduce throttling of fluid flowing through said passage.

11. A membrane diffusion device comprising:
a liquid impervious membrane of generally circular shape through which gases diffuse,
means forming first and second flow passages along opposite sides of said membrane,
means for passing a first fluid through said first flow passage in a generally radial direction, and
means for passing a second fluid through said second flow passage generally diametrically across said membrane.

12. The membrane diffusion device defined by claim 11 including a second membrane extending generally parallel to said first membrane and between which membranes said first fluid passage is formed,
means forming a third fluid passage along the opposite side of said second membrane, and
means for passing said second fluid generally diametrically across said second membrane through said third flow passage in shunt with the fluid flow through said second flow passage.

13. A membrane diffusion device comprising a cell which includes:
first and second membranes,
a first foraminous spacing member interposed between said first and second membranes,
said first and second spaced membranes constituting a first flow passage for the relatively free, turbulent, flow of a first fluid therebetween, first and second liquid impervious flexible walls, second and third foraminous spacing members interposed between said first wall and first membrane and between said second wall and said second membrane, respectively, said first wall and first membrane and said second wall and second membrane constituting second and third shunt connected fluid flow passages for the relatively free, turbulent flow of a second fluid therebetween, and means for applying pressure between said first and second walls to press said walls, spacing members and membranes together into a stack to limit said first, second and third flow passages to substantially the thickness of said first, second and third spacing members, respectively.

14. The membrane diffusion device defined by claim 13 for use in an arrangement for extra-corporeally oxygenating and controlling the temperature of the venous blood of a living animal, said arrangement including means for circulating the blood through said first flow passage, means for passing oxygen through said second and third shunt flow passages, and means for circulating a temperature controlled heat exchange fluid along said walls at the sides opposite said second and third spacing members to control the temperature of said blood flowing in said first flow passage.

15. The membrane diffusion device defined by claim 13 wherein at least one of said impervious flexible walls comprises a portion of a flexible jacket adapted to be subjected to a fluid pressure greater than the pressure of the first and second fluids in said first, second and third fluid flow passages.

16. The membrane diffusion device defined by claim 13 including means sealing said membrane and said impervious flexible walls together about their peripheries, means forming a plurality of axially aligned holes through said membranes, spacing members and walls, fluid inlet and outlet manifold bolts extending through said aligned holes, rings formed with generally radially extending passages positioned on said manifold bolts, and means clamping said rings, membranes and walls together for control of the flow of fluids within said device.

17. The membrane diffusion device defined by claim 13 which includes a plurality of said cells arranged in a stack, means connecting said first flow passage of said cells in shunt, means connecting said second and third flow passages of said cells in shunt, and said means for applying pressure between said first and second walls comprising means for circulating a fluid under pressure in shunt along said walls of the cells at the sides opposite said second and third spacing members.

References Cited

UNITED STATES PATENTS

| | | | |
|---|---|---|---|
| 3,034,505 | 5/1962 | Sobol | 23—258.5 |
| 3,060,934 | 10/1962 | Claff et al. | 23—258.5 |
| 3,266,629 | 8/1966 | Megibow | 210—321 |
| 3,332,746 | 7/1967 | Claff et al. | 23—258.5 |

MORRIS O. WOLK, *Primary Examiner.*

B. S. RICHMAN, *Assistant Examiner.*